Jan. 12, 1932.　　　　B. W. NIBBE　　　　1,840,599
VEHICLE
Filed April 17, 1930　　2 Sheets-Sheet 1

B. W. Nibbe
Inventor

Jan. 12, 1932.   B. W. NIBBE   1,840,599
VEHICLE
Filed April 17, 1930   2 Sheets-Sheet 2

B. W. Nibbe
Inventor

Patented Jan. 12, 1932

1,840,599

UNITED STATES PATENT OFFICE

BERNHARD W. NIBBE, OF ELBOW LAKE, MINNESOTA

VEHICLE

Application filed April 17, 1930. Serial No. 445,065.

This invention aims to provide a trailer or vehicle so constructed that the weight will be located low down, it being an easy matter to unload and load the vehicle, swinging movement of the body of the vehicle being reduced to a minimum, and the ordinary axle, extended from one wheel of the vehicle to the other, being omitted. Another object of the invention is to provide a vehicle of the kind described which, although including a spring-supported body, will be capable of withstanding hard use.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

Figure 1:
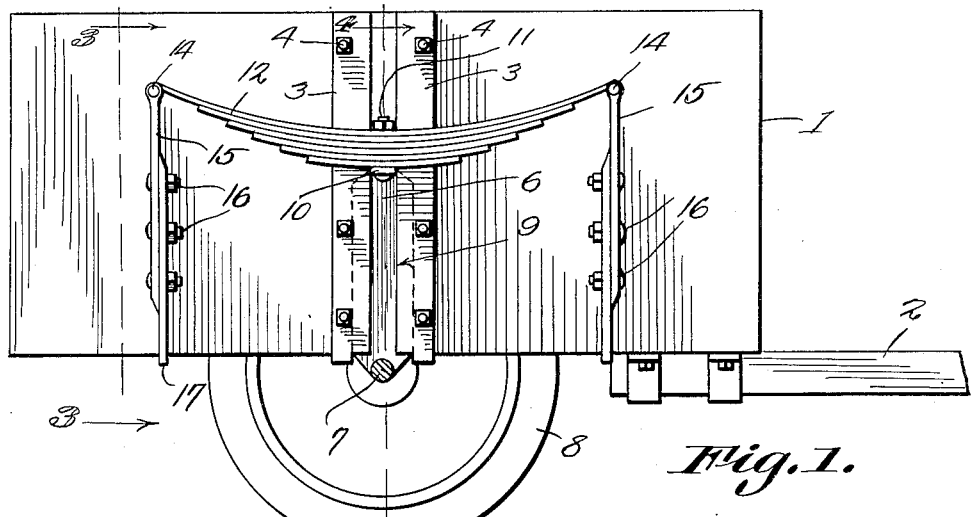
Figure 1 shows in side elevation, a device constructed in accordance with the invention, one of the ground wheels being removed.
Figure 2:
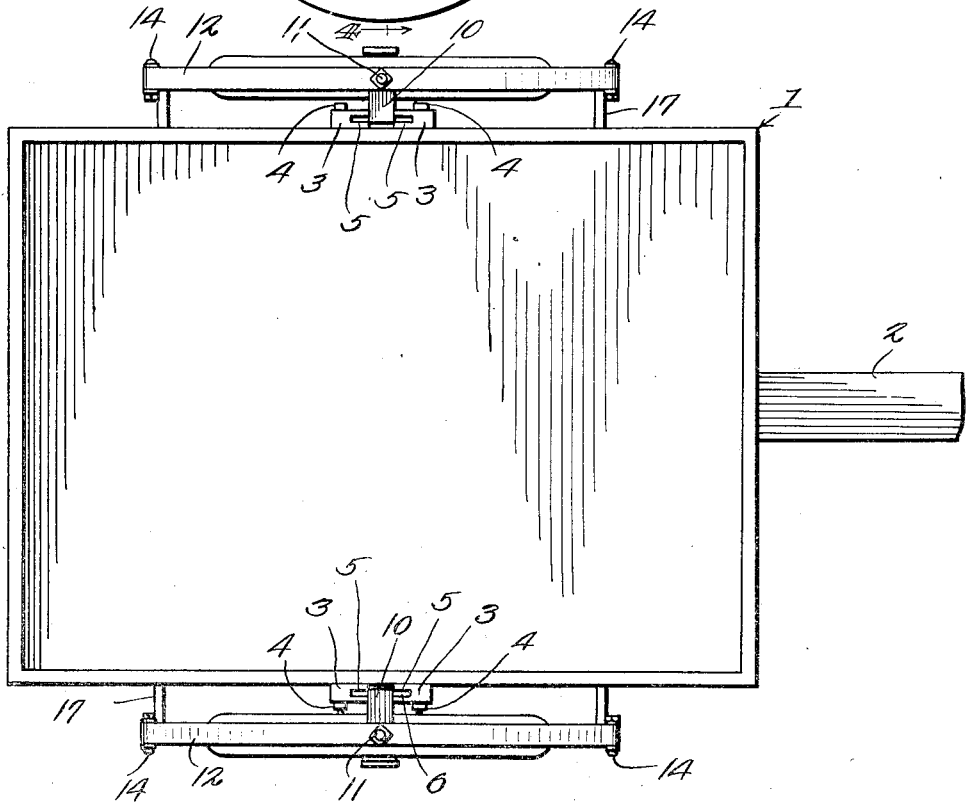
Figure 2 is a top plan.
Figure 3:
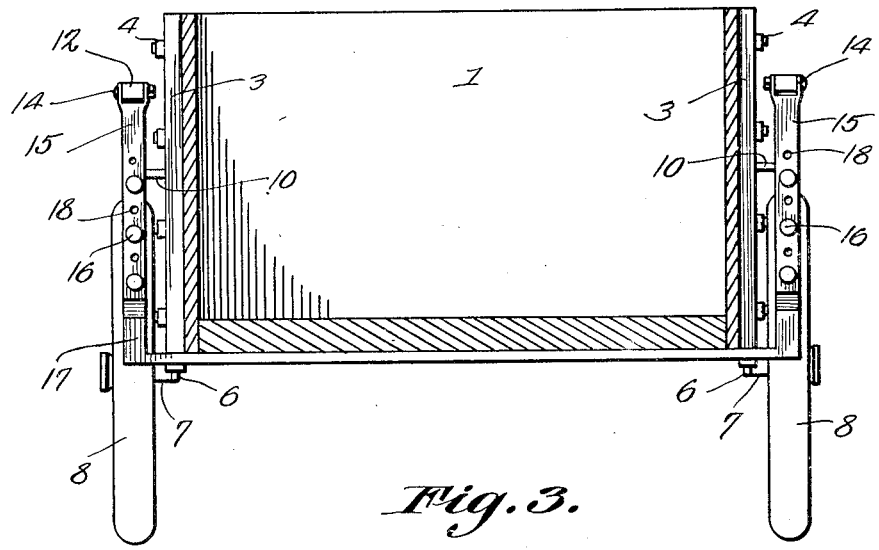
Figure 3 is a transverse section taken approximately on the line 3—3 of Figure 1.
Figure 4:
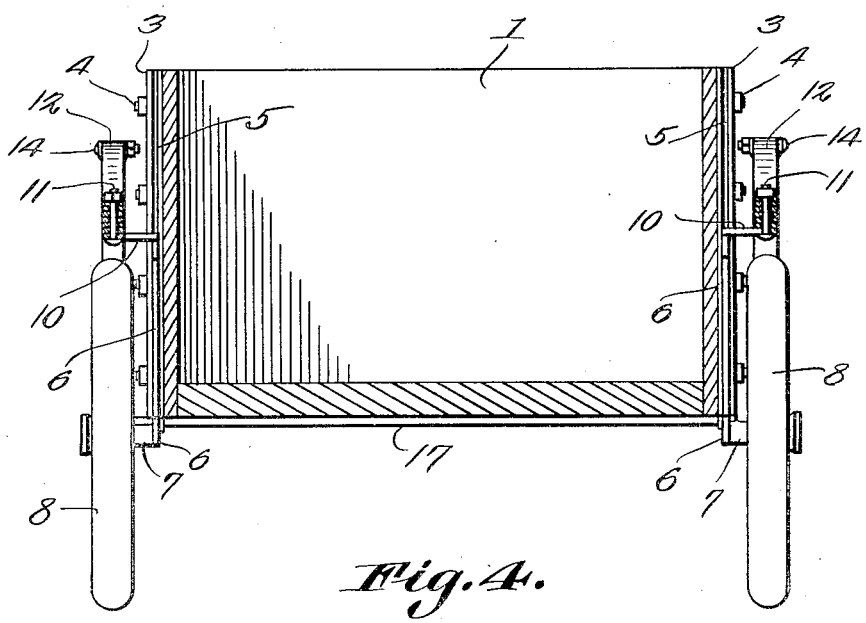
Figure 4 is a section taken approximately on the line 4—4 of Figure 1.

The vehicle forming the subject matter of the present application comprises a body 1 of any desired construction, provided with any suitable draft means, such as a tongue 2. Guide bars 3 are secured at 4 to opposite sides of the body 1. In the inner edges of the guide bars there are grooves 5.

Slides 6, in the form of plates, are mounted for vertical reciprocation in the grooves 5 of the guide bars 3. Outwardly extending stub axles 7 are mounted on the lower ends of the slides 6. Ground wheels 8 are journaled on the axles 7. The space 9 between the guide bars 3 permits the arms 10 on the upper ends of the plates 6 to extend outwardly.

Securing elements 11 connect the arms 10 to the intermediate portions of substantially horizontal bowed leaf springs 12 located at opposite sides of the body and having their ends pivoted at 14 to vertical supports 15, in the form of hanger bars, connected by bolts 16 or the like to U-shaped brackets 17, in which the body 1 is mounted, and wherein the body is secured. The holes 18 in the supports 15 and in the upstanding ends of the brackets 17 may be duplicated to any desired extent, to provide for vertical adjustment.

It will be obvious that the body 1 can move upwardly and downwardly with respect to the wheels 8, the slides 6 moving in the guide bars 3, the springs 12 yielding, and the stub axles 7 entering the space 9 between the guide bars 3. The device is simple in construction, but it affords a means whereby a load can be low-slung with respect to the center of rotation of the ground wheels 8, the resulting device being a vehicle which can be loaded and unloaded readily, the vehicle possessing, at the same time, the advantages of a spring-supported body.

Having thus described the invention, what is claimed is:

A trailer comprising a body, guides secured to opposite sides of the body, slides mounted for vertical reciprocation in the guides, axles on the slides, ground wheels journaled on the axles, substantially horizontal springs secured in their intermediate portions to the slides and located at opposite sides of the body, U-shaped brackets having their upper ends extended upwardly on opposite sides of the body, the body resting in the brackets, between said ends of the brackets, depending hangers pivoted to the ends of the springs, and means for connecting the hangers with said ends of the brackets, for vertical adjustment.

In testimony that I claim the foregoing as my own, I have hereto affixed my signature.

BERNHARD W. NIBBE.